United States Patent [19]

Worrall et al.

[11] Patent Number: 4,520,059
[45] Date of Patent: May 28, 1985

[54] IONOMER-COATED YARNS AND THEIR USE IN PAPERMAKERS WET PRESS FELTS

[75] Inventors: James D. Worrall, East Greenwich; Ronald E. Tefft, Rockville, both of R.I.

[73] Assignee: Engineered Yarns, Inc., Coventry, R.I.

[21] Appl. No.: 562,076

[22] Filed: Dec. 16, 1983

[51] Int. Cl.$^3$ ............................................. B32B 5/12
[52] U.S. Cl. .......................... 428/109; 162/DIG. 1; 428/107; 428/234; 428/235; 428/255; 428/280; 428/300
[58] Field of Search ............... 428/300, 392, 395, 260, 428/262, 265, 267, 247, 255, 234, 235, 109, 280, 236, 245, 107, 378; 525/329; 526/640, 317; 427/207.1; 156/244.11; 162/DIG. 1

[56] References Cited

U.S. PATENT DOCUMENTS

| | | | |
|---|---|---|---|
| 3,739,567 | 6/1973 | Williamson | 428/395 |
| 4,093,512 | 6/1978 | Fleischer | 428/259 |
| 4,259,394 | 3/1981 | Khan | 428/237 |

Primary Examiner—James J. Bell
Attorney, Agent, or Firm—Fleit, Jacobson, Cohn & Price

[57] ABSTRACT

A textile fabric comprising synthetic yarn coated with an ionomer resin, fabric made from the textile fiber and a felt for use in papermaking machines comprising a mesh base and a fibrous upper layer, the mesh base comprising the fabric made from the textile fiber which is an ionomer resin-coated synthetic yarn.

12 Claims, 4 Drawing Figures

FIG. 3
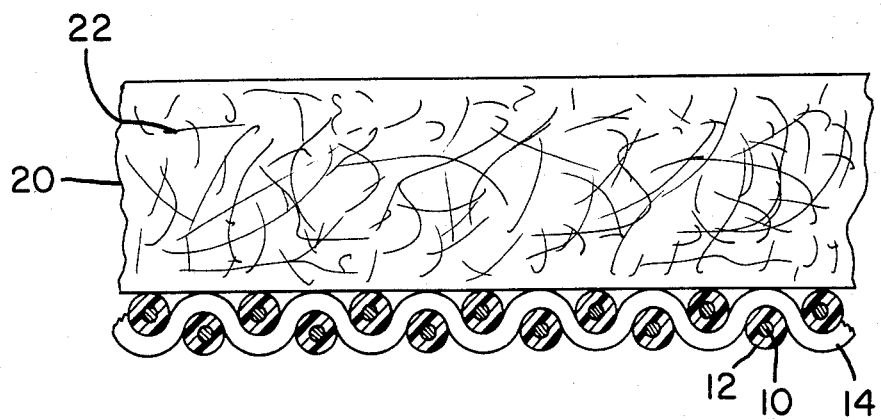
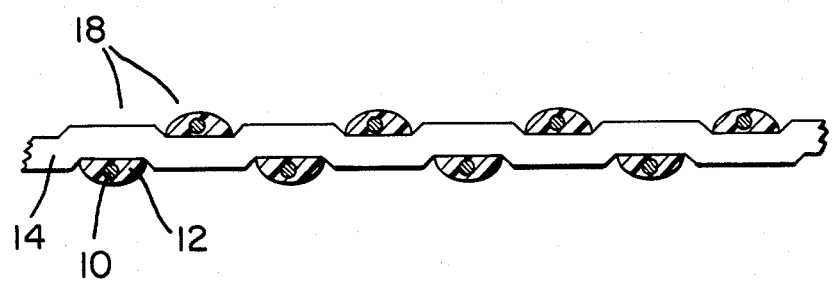
FIG. 4

IONOMER-COATED YARNS AND THEIR USE IN PAPERMAKERS WET PRESS FELTS

BACKGROUND OF THE INVENTION

1. Field of the Invention

This invention relates to synthetic yarn coated with ionomer resin, methods of coating the yarn with ionomer resin, and methods of forming fabric from the ionomer-coated yarn.

More particularly, the invention is directed to wet press felts for use in papermaking machines wherein the wet press felts comprise a base layer which is a fabric made from ionomer-coated yarn in combination with a fibrous batt, the fibrous batt and ionomer-coated base layer joined by a needling process.

2. Description of the Prior Art

In general, papermakers' wet felts comprise an endless belt having a smooth paper-receiving surface and an abrasion-resistant machine roll contacting surface. The press felts perform the function of supporting the paper web during the dewatering process, advancing the paper web to the next stage in the papermaking process, and serving as a receptacle for water removed during the dewatering process, the water also being conveyed away from the processing by the press felt.

During processing as it is known in today's papermaking industry, tremendous roll pressures and high speeds are developed. Accordingly there is a tendency for the wet press felts to wear rapidly due to abrasion and, additionally, to lose porosity and therefore the ability to remove water from the paper web.

Since the 1960's, the paper industry has witnessed and experienced the impact of a paper machine clothing evolution, especially in the press section. The older batt-on-base needled felts have been replaced by more sophisticated batt-on-mesh needled designs which yield greater dewatering efficiencies and longer felt life. These early needled felts had a base woven from spun staple fibers into which the batt fibers, generally nylon, were inserted by the needling process. The weight percentage of the base fibers was relatively high and these fibers were mainly oriented in the machine and cross-machine directions. Thus only a small amount of the capillary volume in the felt was formed by the batt fibers which were mainly vertically oriented. When these felts underwent dewatering on the paper machine by passing through the nip of squeeze rollers, the fibers in the base fabric became compressed, particularly at the crossover points. As the base fibers compressed, the overall felt rapidly lost porosity and capillary structure, yielding poor dewatering properties. Additionally, the compressed fibers increasingly trapped fine particles from both paper and fractured felt fibers which further led to early felt failure.

The newer batt-on-mesh felts utilize high-strength twisted multifilament yarns or monofilaments. The mesh base not only has greater open area between machine and cross-machine yarns, but also resists compaction to a greater degree than the spun yarn base. This greater initial porosity and resistance to compaction has resulted in improved felt life. However, these yarns have the disadvantage of reduced retention of the batt fibers and lower abrasion resistance of the mesh under certain conditions due to fibrillation of the filament surface.

Also known to the prior art is a mesh base which contains highly twisted multifilaments, usually nylon, impregnated with phenolic resin. These twisted yarns are impregnated before weaving by immersing the yarns in a solution of phenolic resin followed by drying at a sufficiently low temperature to evaporate the solvent without curing the resin. The treated yarns in this state remain reasonably flexible to facilitate weaving of the mesh fabric. After needling the batt onto the mesh, the felt is then heat treated at a temperature which will crosslink the phenolic resin into a finally cured stage. However, these phenolic resin-impregnated yarns suffer from poor batt retention and are difficult to weave due to the high friction surface characteristics of the impregnated material.

Fleischer, U.S. Pat. No. 4,093,512, discloses a papermakers' belt comprising ultrahigh modulus load bearing yarns which may be resin coated or wrapped and then resin coated to improve their abrasion resistance. Among the resins suggested for coating the high modulus yarn are acrylic resins, phenolic resins, and nylon resins. The reference fails to disclose any suggestion of the use of an ionomer resin as a coating for synthetic yarns.

Khan, U.S. Pat. No. 4,259,394, discloses a papermaking fabric composed of a base having a fibrous batt needled to one surface thereof. The base is formed of interwoven core wrapped yarns comprising core yarns which are effectively heat infusible and wrapping yarns which are effectively heat fusible. Polyethylene and polypropylene are the only resins disclosed as wrapping materials.

Thus a need has continued to exist for a yarn suitable for forming the mesh layer of papermakers' wet felt which has good abrasion resistance, good durability, good toughness, good resistance to compression, good adhesion at the crossover points, low frictional characteristics, good needling characteristics regarding both integrity of the base yarns and batt retention, and good handling characteristics during weaving.

SUMMARY OF THE INVENTION

It is an object of this invention to provide a yarn suitable for fabrication into the mesh layer of a papermakers' wet felt of the batt-on-mesh type.

It is an object of this invention to provide a papermakers' wet felt of the batt-on-mesh type wherein the mesh layer is characterized by excellent toughness, durability, and abrasion resistance.

It is yet another object of this invention to provide a papermakers' felt of the batt-on-mesh type wherein the mesh layer has high resistance to compression and excellent adhesion at the crossover point.

It is still another object of this invention to provide a papermakers' wet felt of the batt-on-mesh type wherein the mesh layer demonstrates excellent needling characteristics regarding both base yarn stability and batt retention.

It is still another object of this invention to provide a papermakers' wet felt of the batt-on-mesh type wherein the mesh layer demonstrates excellent dimensional stability.

It is yet another object of this invention to provide a papermakers' wet felt of the batt-on-mesh type wherein the mesh demonstrates a reduced crossover bulk or profile, the "knuckles" being reduced by resin flow-out.

These and other objects of the invention, as will hereinafter become more readily apparent, have been accomplished by coating synthetic yarns with ionomer resin and fabricating the mesh layer of a batt-on-mesh type of papermakers' wet felt from the synthetic yarn coated with the ionomer resin.

BRIEF DESCRIPTION OF THE DRAWING

FIG. 3 is a sectional view of a papermakers' wet felt in accordance with this invention.

FIG. 4 is a sectional view taken along line 2—2 of FIG. 2.

DESCRIPTION OF THE PREFERRED EMBODIMENT

Figure 1:
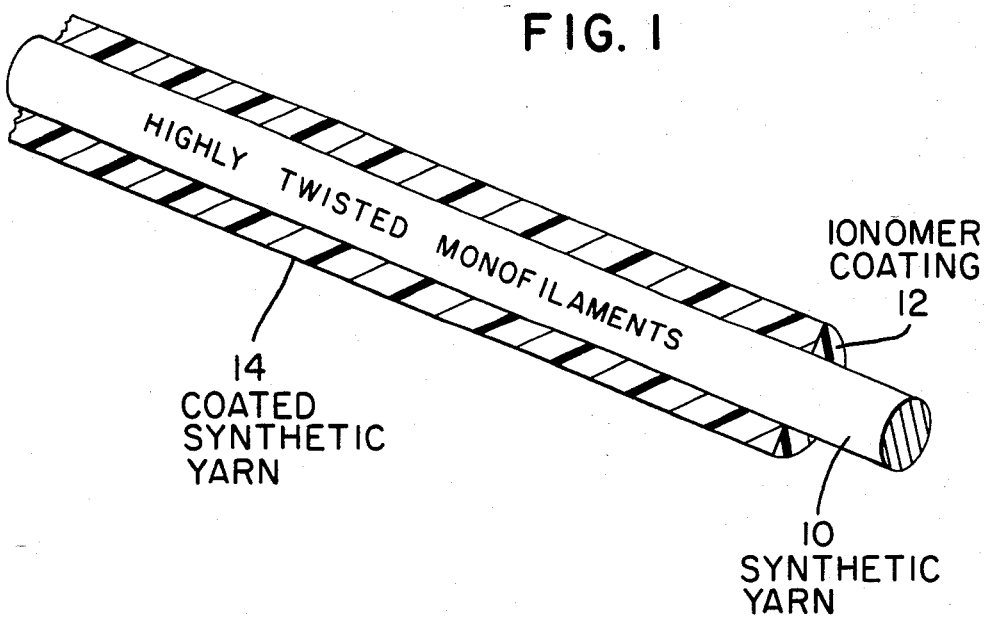
FIG. 1 is a perspective view, partially cut away, of a synthetic yarn coated with an ionomer resin.
Figure 2:
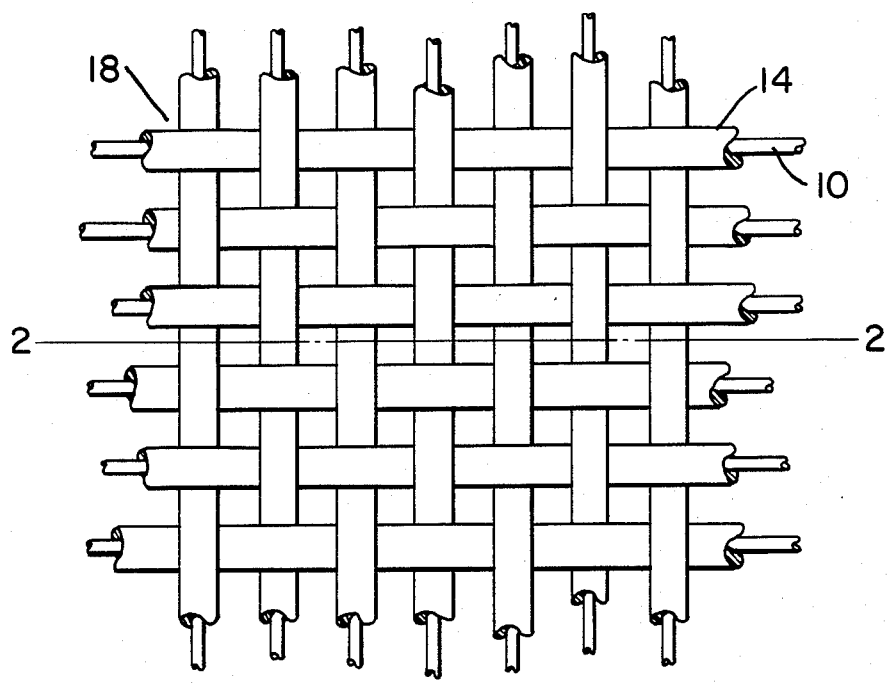
FIG. 2 is a top plan view of a plain weave mesh layer in accordance with this invention.

With reference to FIG. 1, the synthetic yarn which is coated with ionomer resin is generally designated as 10. Suitable synthetic yarns include, but are not limited to, polyamides such as polycaprolactam (Nylon 6), polyhexamethylene adipamide (Nylon 66), polyhexamethylene dodecanoamide (Nylon 612), polyacrylics such as Orlon, polyesters such as Dacron, polyvinyl chlorides, rayon, Nomex and kevlar. Polyamides are the preferred synthetic yarns for the practice of this invention, with Nylon 6,6 most preferred.

Included within the contemplation of this invention are monofilament and multifilament yarns, including highly twisted yarns. Twisted yarns are preferred because of their round core and low compressibility. Most preferred are twisted yarns of plied construction, the plied, twisted yarns demonstrating the lowest degree of compressibility. Twisted yarns having 8 to 16 TPI in the singles and 7 to 12 TPI in the ply are typical, with the more highly twisted yarns being preferred. Typical yarn size for plied multifilament yarns is 220 denier, 3 ply to 1680 denier, 3 ply. Typical size range for plied monofilament yarns is 5 mil 3 ply to 8 mil×2, 3 ply. The preferred size range for single multifilament yarns is in the range of 420 denier to 1680 denier. Monofilament yarns have been prepared by coating a Nylon 6 yarn consisting of 2 ends, plied threefold (resulting in six ends). Single monofilaments suitable for coating are typically in the range of 0.005 to 0.015 inches. Typical yarns suitable for the practice of this invention include, but are not limited to, a highly twisted yarn of 420 denier, 3 ply with a twist of 15 turns per inch in the singles and 8 turns per inch in the ply; and 840 denier, 3 ply with a twist of 15 turns per inch in the singles and 8 turns per inch in the ply.

The ionomer resin coating 12 on the synthetic yarn (10) is a metal salt of a copolymer of ethylene and a vinyl monomer containing an acid group. Typical monomers which are copolymerized with ethylene include acrylic acid and methacrylic acid. These copolymers exist as the metal salts. The unique properties of ionomer resins are to a great extent dependent on the presence of the strong interchain forces in the long chain molecules of the polymer structure. These interchain forces are developed between ionized carboxyl groups pendent from the polymeric chains. Metallic ions such as sodium, potassium, calcium, magnesium and zinc are associated with the ionized carboxyl sites to provide a thermally reversible interchain linkage. This interchain bonding develops properties normally associated with a cross-linked structure. However, since the ionic links are thermally reversible, these polymers may be processed at conventional temperatures in standard plastics processing equipment. These ionomer resins are well known to the art and commercially available under the trade name "Surlyn" from E. I. Du Pont de Nemours & Company, Inc., the ionomer formulations being available in a broad, complex range of compositions. Surlyn 9720 is the preferred ionomer resin for the purposes of this invention.

The ionomer coating may be applied by various coating techniques. The preferred coating technique is by crosshead extrusion. A tubing die is used in the crosshead to facilitate splice transfer to allow continuous running of one yarn supply package to another. In one embodiment of the coating process, vacuum is applied to the die to draw the coating down upon the yarn while coating progresses. This effect is not critical since the ionomer possesses the property of later shrinking down upon the yarn substrate during heat treatment of the finished wet felt, thereby yielding a tight mechanical bond between the coating and the substrate. It is also possible to build up a suitable resin coating by repeated dips into an aqueous dispersion of ionomer. It is preferred that the final coated yarn contain at least 50% by weight of the ionomer.

Upon heating, the ionic bonding forces of the ionomer resin coating are greatly reduced thereby enabling the material to be easily processed, especially for crosshead extrusion yarn coating which requires high throughput speeds of the substrate to maintain favorable economics.

Techniques for fabricating mesh base fabric from yarn are well known to the art. The mesh base fabrics may be of the woven or non-woven type. Any of the conventional weaving patterns known to the art are contemplated as within the scope of this invention, the coated yarns being used in both the machine and cross-machine direction, in the case of a woven fabric, and as the principal yarn, in the case of a non-woven fabric.

These ionomer-coated yarns possess properties making them uniquely suited for mesh fabric bases for wet press felts. The outstanding adhesion of the coated yarns at the crossover points yields fabrics of exceptional stability. An unexpected feature at the crossover points is that these points are relatively flat and smooth and are not appreciably thicker than the yarns themselves, these reduced "knuckles" greatly improving the wear resistance of the felt during continued passes through press and roller nips. This feature may best be understood by reference to FIG. 4. As depicted in FIG. 4, crossover points 18, are relatively flat and smooth and are not appreciably thicker than the yarns themselves. The small amount of tension placed on the coated yarns during the shrinkage resulting from heating forces the yarns to sink into the resin coating at the contact points.

Additionally, the melt properties of the ionomer are such that the resin remains close to the core yarn surface after heating so that there is virtually no "webbing" at the corners of the crossover point which would reduce the mesh open area. The toughness of the ionomer imparts low compressibility and excellent recovery from compression. Additionally, the ionomer-coated yarns offer greatly improved processing advantages over phenolic resin-impregnated yarns, monofilaments, and polyurethane-coated yarns. They possess the smooth, low friction surface characteristics of monofilaments but have a softer hand which facilitates handling during the weaving operation.

Similarly, suitable fibrous batt materials are well known to the art. Fibrous batt materials contemplated as within the scope of this invention include, but are not limited to, natural fibers such as wool and synthetic fibers such as nylon, Dacron, etc. Also contemplated are combinations of synthetic and natural fibers.

The fibrous batt material is attached to the mesh substrate by any of the methods conventionally known to the art. Preferred among the known methods is the process of needling. One unexpected advantage resulting from the practice of the invention as described above is that during the needling operation, the ionomer-coated yarn resists damage by needle penetration during the needling operation since the ionomer coating deflects the yarn upon needle contact, thereby maintaining the integrity of the load-bearing core and consequently the tensile strength and stability of the mesh base. Where a needle does penetrate the coated yarn, no negative effects result. This is in direct contrast to the effects of needle penetration on uncoated monofilaments where needle penetration causes almost total loss of tensile strength at the penetration point. Essentially no loss of tensile strength results from needle penetration of the ionomer-coated yarn. Additionally, adhesion of the nylon batt fibers to the ionomer resin after felt heat treatment is far superior to the prior art yarns. Upon heat setting, there is increased opportunity for batt fiber to adhere to the coated yarns at the point of coating penetration.

FIG. 3 is a sectional view of the felt 20 in accordance with this invention. Fibrous batt 22 is adhered to mesh base 16 by any conventional means.

Because of the exceptional adhesive bonding properties of the ionomer coating, machine direction yarn spacing may be increased and less dense needling is required since the added batt bonding provided by the ionomer furnishes the increment of cross-machine tensile stength lost because of the change in spacing and needling. This increased machine direction yarn spacing and less dense needling provides the added advantage of yielding a felt with greater porosity and improved dewatering characteristics.

Having generally described the invention, a better understanding can be obtained by reference to certain specific preliminary examples which are provided herein for purposes of illustration only and are not intended to be limiting unless otherwise specified.

EXAMPLE 1

A yarn containing 420 denier 3 ply nylon with a twist of 15 turns per inch in the singles and 8 turns per inch in the ply was coated with an ionomer resin available from E. I. DuPont de Namours & Company, Inc. under the tradename Surlyn 9720. A crosshead extrusion process utilizing a tubing die in the crosshead was employed to coat the ionomer resin onto the nylon yarn. Vacuum was applied to the die to draw the coating down upon the yarn during the coating operation. The resulting ionomer-coated yarn was about 0.031" in diameter, had a yield of about 1250 yards per pound, and contained about 61.5% ionomer by weight.

EXAMPLE 2

Utilizing the same coating techniques employed in Example 1, a yarn containing 840 denier 3 ply nylon with a twist of 15 turns per inch in the singles and 8 turns per inch in the ply was coated with ionomer resin traded under the name Surlyn 9720. The resulting ionomer-coated yarn was about 0.039" in diameter, had a yield of 814 yarns per pound, and contained about 48% ionomer resin by weight.

Having now fully described the invention, it will be apparent to one of ordinary skill in the art that many changes and modifications can be made thereto without departing from the spirit and scope of the invention as set forth herein.

What is claimed is:

1. A papermakers' felt of the batt-on-mesh type having a mesh layer which comprises synthetic yarns coated with an ionomer resin so that said mesh layer is resistant to abrasion and compression.

2. The papermakers' fiber of claim 1 wherein said synthetic yarn is selected from polyamides and polyesters.

3. The papermakers' felt of claim 1 wherein said synthetic yarn is a polyamide.

4. The papermakers' felt of claim 1 wherein said ionomer resin is a metal salt of an ethylene-vinyl carboxylic acid copolymer.

5. The papermakers' felt of claim 4 wherein the vinyl carboxylic acid is selected from acrylic acid and methacrylic acid.

6. The papermakers' felt of claim 1 wherein said synthetic yarn is a highly twisted yarn.

7. The papermakers' felt according to claim 1 wherein said synthetic yarns coated with ionomer resin are non-woven.

8. The papermakers' felt according to claim 1 wherein said synthetic yarn is selected from nylon and polyester.

9. The felt according to claim 8 wherein said synthetic yarn is nylon.

10. The papermarkers' felt of claim 1 wherein said synthetic yarns coated with ionomer resin are woven.

11. A method of making an ionomer-coated synthetic yarn comprising extrusion-coating a synthetic yarn with an ionomer resin in such a manner that said yarn is resistant to abrasion and compression.

12. The method of claim 11 wherein said extrusion coating is a crosshead extrusion coating.

* * * * *